United States Patent [19]

Thomason et al.

[11] 4,029,082

[45] June 14, 1977

[54] HEAT AND COLD STORAGE APPARATUS

[76] Inventors: Harry E. Thomason; Harry Jack Lee Thomason, Jr., both of 609 Cedar Ave. (Fort Washington, Md.), Washington, D.C. 20022

[22] Filed: June 19, 1974

[21] Appl. No.: 480,752

[52] U.S. Cl. .............................................. 126/271
[51] Int. Cl.² .......................................... F24J 3/02
[58] Field of Search ......... 126/270, 271, 400, 113; 261/94–98; 165/18, 21; 237/1 A, 78; 236/44 A, 44 R; 219/272; 4/160–165

[56] References Cited

UNITED STATES PATENTS

| 3,277,274 | 10/1966 | Raabe | 219/362 |
|---|---|---|---|
| 3,547,348 | 12/1970 | Kruper | 236/44 |
| 3,739,144 | 6/1973 | Janson | 219/362 |

Primary Examiner—John J. Camby
Assistant Examiner—Larry I. Schwartz

[57] ABSTRACT

Solar heat storage apparatus, invented by Thomason, includes a tank of water surrounded by a truckload of stones in a heat storage bin in the basement, U.S. Pat. No. 3,254,702 and others. Air circulating through the bin is warmed and circulated through the home to warm the home, or other building.

The present invention adds humidity to the air and also enhances heat transfer out of the storage bin and into the home by heat-of-vaporization. That permits use of heat from storage to a lower temperature level while making the home feel warmer. And, the solar heat collector obtains more free heat from the sun because it is operating at a lower temperature level and more efficiently.

Heat that normally goes up the chimney from an auxiliary heat source, such as a water heater or furnace, is used to assist home heating.

10 Claims, 4 Drawing Figures

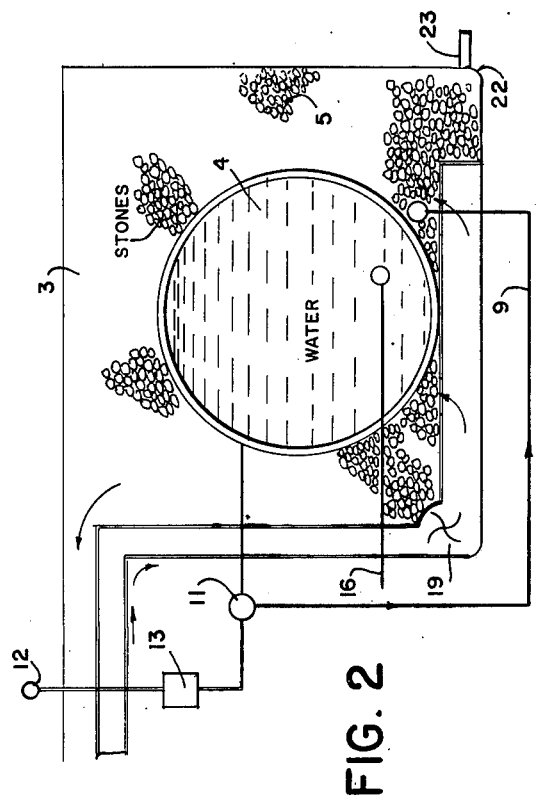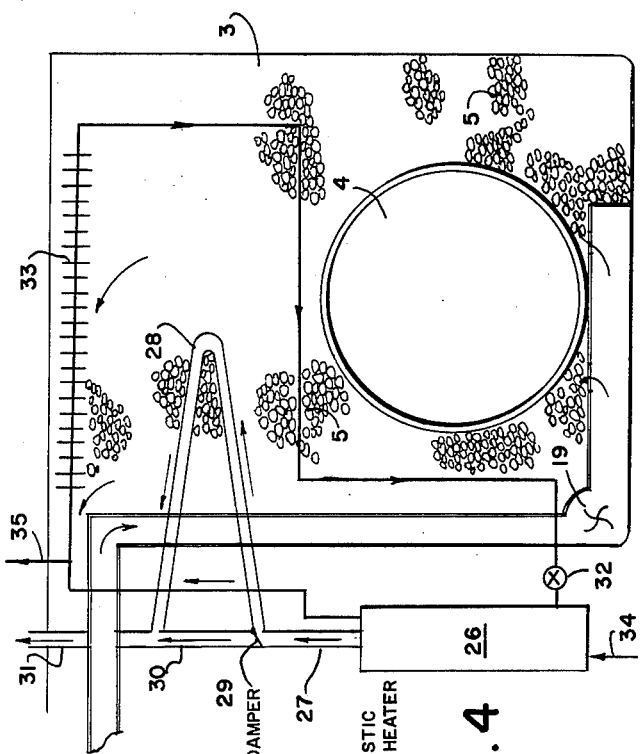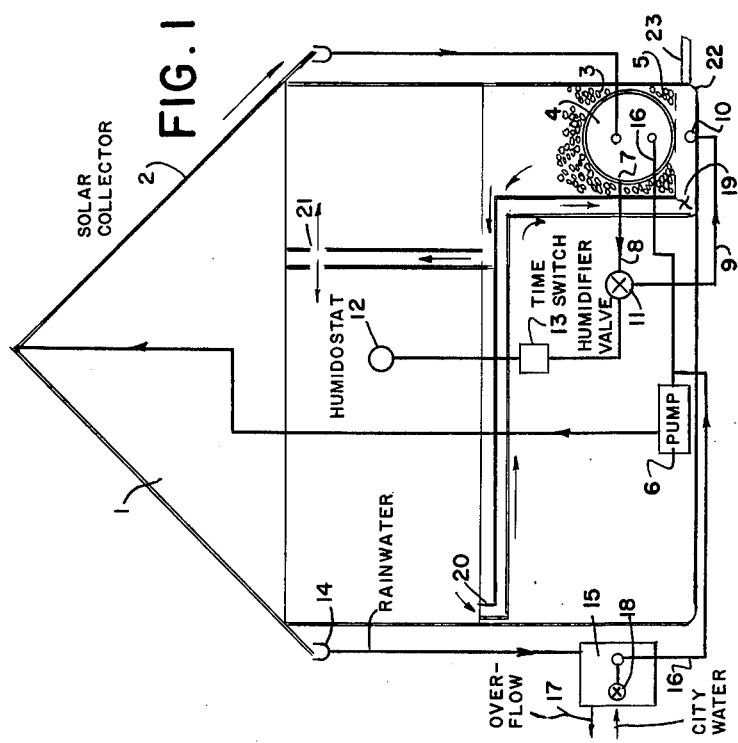

HEAT AND COLD STORAGE APPARATUS

BACKGROUND

As the Energy Crisis was heaped on top of the Pollution Crisis the costs of electricity, oil, gas and coal skyrocketed. Attention turned to solar heating with the low-cost open-flow corrugated metal solar heat collector (Thomason U.S. Pat. Nos. 3,145,707; 3,215,134, etc.). The low-cost Thomason heat storage bin, using free rain from the heavens and stones from the field, was widely studied and reported in many publications (U.S. Pat. No. 3,254,702 and others). That basic storage bin, and modifications, permitted heat storage for the winter and was completely reversible for cold storage for the summer. And, it permitted dry storage to absorb excess moisture on hot muggy days (Thomason U.S. Pat. No. 3,812,903 and others).

Success of that storage apparatus includes its ability to deliver heat out of storage down to a very low temperature level. Therefore most of the free stored solar heat could be used on cloudy days and nights before expensive auxiliary heat from oil was required. By using more heat out of storage the temperature was left lower. The water was cooler when it was pumped to the solar heat collector after the sun came out, or a bright cloudy day warmed the solar heat collector. Because the water pumped to the collector was cooler it picked up more free heat from the sun, thereby making solar heat collection more efficient. All of that lead to a very efficient system. It has low-cost components for collecting heat, storing heat, cold and dryness, and recovering heat or cold from storage by automatic controls. The systems are known as the "Thomason Solaris Systems" and have been in continuous use since 1959.

BRIEF SUMMARY

The inventors are improving the basic Solaris Systems in many ways. In the present case, during the winter, they are adding humidity to the air circulating through the storage bin to increase comfort in the home. And, they are increasing heat transfer from storage by heat-of-vaporization.

In its simple form, water is dispersed in the bin and it spreads to permit its evaporation into the air circulating therethrough. As the water vaporizes its absorbs heat from the concrete floor, stones, concrete blocks, tank of water and so on, thereby leaving them cooler. The air, now humidified, is warmed further as it moves on through the heat storage bin. The warmed humidified air is then passed to the home or other building to be heated. The humidified air feels warmer even if its temperature is the same as drier air. Or, it feels just as warm even if the temperature is actually lower. And, importantly, the water, etc., in the storage bin, are left cooler because much of their heat has been absorbed by heat-of-vaporization and transferred into the home.

After yielding up heat, due to heat-of-vaporization around the tank (or from the tank in one embodiment), the water in the storage tank is pumped to the solar heat collector. That cooler water picks up more Btu's of free heat from the sun than warmer water would have. The results are:

1. Higher efficiency of the system with more free heat from the sun;
2. A more comfortable home because the humidified air feels warmer than dry air.
3. The air in the home is not so dry and does not leave the occupants with dry throats and noses.

In the present case the inventors are also reducing auxiliary heat costs by capturing and using heat that normally passes up the chimney from a domestic water heater, a furnace, or such.

IN THE DRAWING:

FIG. 1 is a schematic diagram illustrating the invention;
FIG. 2 is an enlarged detail;
FIG. 3 is a modification;
FIG. 4 is another modification.

FIG. 1 diagramatically illustrates a feature of the invention wherein a home or other building 1 has a solar heat collector 2 on a section of the roof facing the sun.

Heat storage bin 3 has wherein a water tank 4 and stones, containers of heat of fusion heat storage material or such 5. Water from tank 4 is circulated through solar collector 2 by pump 6 and warm water is returned to tank 4 in a manner described in numerous Thomason patents.

Water from tank 4 may flow out at 7 and through lines 8 and 9 to outlet 10 in storage bin 3. Outlet 10 may, if desired, be a perforated pipe to distribute the water. Humidifier value 11 may be controlled by humidostat 12. A time switch 13 may be used if desired for purposes explained hereinafter. Indeed, time switch 13 could be used for periodic operation of valve 11 even without a humidostat. Or, the humidostat could be used without a periodic time switch.

Warm water from tank 4 evaporates more readily and thereby: 1. adds more moisture to the air, achieving greater rate of humidification; and 2. transfers more heat out of storage into the air, and consequently into the home or other space to be warmed and humidified. These desirable functions would not be obtained if cold city water were introduced directly to the stones.

Rainwater from the roof automatically fills tank 4 through gutter 14, automatic rainwater makeup and sediment trap 15 and fill link 16. Excess rainwater automatically overflows at 17. If the water in tank 4 drops to the level of humidifier line 8 without adequate rain to restore the water used from tank 4, then valve 18 may add water from the city water main as needed for humidification purposes. Valve 18 may be a simple low-cost automatic float controlled valve, similar to those used in toilets. It may be placed inside of trap 15, inside of tank 4, or may be connected in other ways obvious to those skilled in the art.

Blower 19 circulates air from the upstairs area, preferably from the area along the cold exterior walls as at 20, to the bottom of the storage bin, up through the stones and around the warm tank of water and back out into the upstairs area as at 21.

The bottom of the storage bin may be slightly dish shaped as at 22. This is a simple matter of finishing the concrete floor with a little dip or with turned-up edges. Then, when a limited amount of water is added at outlet 10 it may spread out but not flow into adjacent basement areas. If an excess of water should accidentally discharge through outlet 10 then an overflow drain 23 allows for automatic drainage. (The heat storage bin occupies only 12%, leaving 88% of the basement space available for other uses in new solar house designs by the Thomasons.)

In FIG. 3 a modification uses a humidifier valve 11' to permit water to flow out from tank 4 through openings 11" into stones or such 5. Heat of vaporization leaves the stones, etc. cooler. If furter humidification is desired lid 24 may be opened, by motor 25 for example, to permit moisture to escape directly from the tank into the air being circulated by blower 19. Either or both of these features yields heat transfer by heat-of-vaporization from the storage apparatus to the upstairs area.

FIG. 4 illustrates a feature that may be used to reduce heat losses up the chimney. Domestic water heater (or furnace) 26 has a flue pipe 27 with a branch 28 extending out into heat storage bin 3. Damper 29 diverts the hot gases of combustion through branch 28 for the winter or bypasses branch 28 directly through section 30 to stack 31 during the hot summer.

If desired the domestic water heater 26 may be used to supply hot water to a heating coil 33 in the heat storage bin. Flow of that water is controlled by valve 32. That provides auxiliary heat for long cloudy spells without use of an expensive furnace in a manner taught by the Thomasons in application Ser. No. 398,323, filed Sept. 18, 1973. Cold domestic water enters at 34 and hot domestic water leaves at 35. (Of course hot water for coil 33 could be provided by a regular furnace.)

OPERATION

When the tank of liquid and stones are warm, cold air from along the cold walls of the home, being heavy, drops to the bottom of the storage bin. That crowds the lighter warm air up through the warm bin, up through passages above and out into the living quarters. The result is a limited amount of absolutely free heat transfer by natural convection currents. When added heat is needed, a thermostat, not shown, turns blower 19 on to boost air circulation and heat transfer. (Only one-sixth HP is used in Thomason Solar House No. 3.) If additional heat is needed valve 32 is opened by a second set of contacts on the thermostat to supply supplementary heat, all controlled by a single thermostat.

When humidostat 12 calls for more moisture in the air it opens valve 11 (or 11' in FIG. 3), to permit water to flow from tank 4 to outlet 10. The flow rate may be regulated in any one of several ways. Simple ways would be to use a small valve or a partially closed valve at 11, or a small opening at outlet 10 (or several small openings along a pipe at outlet 10). However, small valves or small holes can become stuck or clogged and inoperative or erratic in performance. Inasmuch as a typical maximum flow rate for humidification is only about a gallon per hour, and sometimes far less, the problem of control is probably best met by use of a simple low-cost periodic time switch 13. Periodically, if the humidostat 12 calls for moisture, the time switch allows valve 11 to open wide. During a relatively short period of time the water flows relatively fast and wets a fairly large area in the storage bin. Then the time switch turns the water off for a substantial period of time. The dampened rocks, concrete, and so on, yield up their moisture to the air flowing through the bin. As the humidity rises the humidostat closes the valve, or keeps it from opening when the time switch turns on again.

If desired the humidostat may be eliminated and only a time switch used to periodically open valve 11. Or, the time switch could be eliminated.

Heat transfer by heat-of-vaporization becomes important. As the circulating air evaporates moisture from the bin it has a cooling or refrigerating effect and a substantial amount of heat is used from storage. And, that heat used from storage leaves the bin cooler. Cool water is then pumped to the solar heat collector. Because the water is cooler it picks up more Btu's of free heat in the collector, that is, the solar heat collector becomes more efficient. (It is well-known that any solar heat collector is more efficient in trapping solar energy at low temperature levels.) So, heat transfer by heat-of-vaporization:

1. Increases efficiency of trapping and using free Solar Energy, thereby reducing fuel bills for auxiliary heat;
2. Makes the home air feel warmer;
3. Keeps the nose and throat, furniture, etc. from becoming dry.

In FIG. 4 use of hot flue gases through branch 28 reduces heat losses up the chimney and thereby reduces use of auxiliary heat. Also, the furnace may be eliminated and the domestic water heater used for auxiliary heat through hot water heat coil 33.

We claim:

1. Apparatus for storing heat, recovering heat from storage and humidifying air for home or other space heating needs comprising, a storage bin having heat storage material therein, means to channel air in sequence as follows; from a space to be warmed to enter and flow through said storage bin to pick up heat from storage at low temperature to warm the air and return the warm air to the space to be warmed; water supply means to introduce water to dampen said heat storage material and add moisture to the low temperature air, said water, upon vaporizing and adding moisture, extracting heat from said storage material at low temperature and transferring said low temperature heat and moisture to the space to be warmed, said water supply means being within the bin and acting as further heat storage material.

2. Apparatus as in claim 1 wherein said supply means introduces the water adjacent to the bottom of the storage bin and the means to channel air comprises ductwork to introduce air adjacent to the bottom of the storage bin whereby cool air is first humidified and low temperature heat is used from storage adjacent to the bottom of the bin and the humidified air ascends for further heating in the storage bin.

3. Apparatus as in claim 1 and means to control the introduction of water comprising valve means to admit water as needed.

4. Apparatus of claim 3 and means to open and close said valve means periodically.

5. Apparatus as in claim 3 and humidostat means controlling said valve means.

6. Apparatus as in claim 5 and periodic time control means to admit water intermittently when said humidostat calls for adding moisture.

7. Apparatus as in claim 1, said storage bin including dispersing material adjacent to the bottom such as concrete, stones, cinder or concrete blocks, or the like, and said water supply means comprises valve means to introduce water to dampen or wet said dispersing material.

8. Apparatus as in claim 7 and means to open and close said valve means periodically.

9. Apparatus as in claim 7 and humidostat means to control said water supply means to add moisture as needed or to shut off moisture when not needed.

10. Apparatus as in claim 9 and periodic time control means to admit water intermittently when said humidostat calls for adding moisture.

* * * * *